United States Patent
Goh et al.

(10) Patent No.: US 7,679,338 B2
(45) Date of Patent: Mar. 16, 2010

(54) DC/DC CONVERTER WITH SPREAD SPECTRUM SWITCHING SIGNALS

(75) Inventors: Han-Tiet Goh, Taipei (TW); Ping Chen, Taipei (TW); Chun-An Chao, Taipei (TW); Ming-Shuan Lee, Taipei (TW); Chia-Hsin Tsai, Taipei (TW)

(73) Assignee: ALI Corporation, Taipei (TW)

( * ) Notice: Subject to any disclaimer, the term of this patent is extended or adjusted under 35 U.S.C. 154(b) by 284 days.

(21) Appl. No.: 11/844,357

(22) Filed: Aug. 24, 2007

(65) Prior Publication Data

US 2009/0051395 A1 Feb. 26, 2009

(51) Int. Cl.
*G05F 1/70* (2006.01)

(52) U.S. Cl. ........................ 323/222; 327/157

(58) Field of Classification Search ............. 363/21.01, 363/21.05, 21.08, 21.13, 21.16, 21.18, 97, 363/131, 222, 259, 260; 327/538–545, 157, 327/158, 150; 377/44, 46; 455/76, 77, 183.1
See application file for complete search history.

(56) References Cited

U.S. PATENT DOCUMENTS

| 4,441,098 A * | 4/1984 | Borras et al. .................. 341/20 |
| 2006/0192537 A1 | 8/2006 | Hagen |

* cited by examiner

*Primary Examiner*—Rajnikant B Patel
(74) *Attorney, Agent, or Firm*—Winston Hsu

(57) ABSTRACT

A DC/DC converter includes a converting circuit for converting a first voltage into a second voltage; a controller for generating spread spectrum switching signals; and a switch according to the spread spectrum switching signals controlling the on/off state of the switch.

13 Claims, 2 Drawing Sheets

DC/DC CONVERTER WITH SPREAD SPECTRUM SWITCHING SIGNALS

BACKGROUND OF THE INVENTION

1. Field of the Invention

The present invention relates to a DC/DC converter, and more particularly, to a DC/DC converter with spread spectrum switching signals for turning on and off switches.

2. Description of the Prior Art

Please refer to FIG. 1. FIG. 1 is a diagram illustrating a conventional DC/DC converter 100. As shown in FIG. 1, the DC/DC converter 100 comprises an inductor L1, a switch Q1, a diode D1, a capacitor C1, two resistors R1 and R2, and switch controller 110. The DC/DC converter 100 receives a first DC power source (of a voltage V1), converts the first DC power source into a second DC power source (of a voltage V2), and outputs the second DC power source. The inductor L1 is coupled to the input end for receiving the first DC power source. The switch Q1 is coupled between the inductor L1 and the ground end. The diode D1 is coupled between the switch Q1 and the capacitor C1. The capacitor C1 is coupled between the output end and the ground end. The resistor R1 is coupled between the output end and the resistor R2. The resistor R2 is coupled between the resistor R1 and the ground end. The switch controller 110 is coupled to the control end of the switch Q1.

The switch controller 110 controls turning on and off the switch Q1. When the switch Q1 turns on, the current is stored in the inductor L1. When the switch Q1 turns off, the stored current in the inductor L1 passes through the diode and charges the capacitor C1. The output voltage V2 is the voltage over the capacitor C1. The switch controller 110 controls the turning-on period in each cycle (duty cycle) so as to adjust the output voltage V2.

The resistors R1 and R2 are utilized as voltage dividers. The voltage $[R2/(R1+R2)] \times V2$ is fed back to the switch controller 110 for informing the switch controller 110 of the voltage V2.

The switch controller 110 receives a reference clock signal CLK1, and outputs a control signal S1 to the switch Q1 according to the voltage $[R2/(R1+R2)] \times V2$. The frequency of the control signal S1 is same as the clock signal CLK1 but the duty cycle adjusting the control signal S1 is set according to the voltage $[R2/(R1+R2)] \times V2$ for controlling turning-on/off period of the switch Q1. Thus, the voltage V2 is controlled. That is, when the duty cycle of the control signal S1 is larger, the turning-on period is longer, and the current stored in the inductor L1 is bigger, and thus, the voltage V2 rises gradually. On the other hand, when the duty cycle of the control signal S1 is lower, the turning-on period is shorter, and the current stored in the inductor L1 is smaller, and thus, the voltage V2 drops gradually. Additionally, the reference clock signal CLK1 is 12 MHz.

However, the conventional switch controller transmits the control signal S1 based on a fixed frequency and an adjustable duty cycle. That is, the control signal S1 generates a base frequency (12 MHz), which is a source of interference in general portable electronic devices, causing bad connections and impacting the convenience of the portable electronic devices.

SUMMARY OF THE INVENTION

The present invention provides a DC/DC converter with spread spectrum switching signals. The DC/DC converter comprises a converting circuit, a spread spectrum switch signal controller for generating a spread spectrum switching signal, and a switch. The converting circuit comprises an input end for receiving a first DC power source, and an output end for outputting a second DC power source. The switch is coupled to the converting circuit and the spread spectrum switching signal controller. The switch is turned on and off according to the spread spectrum switching signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
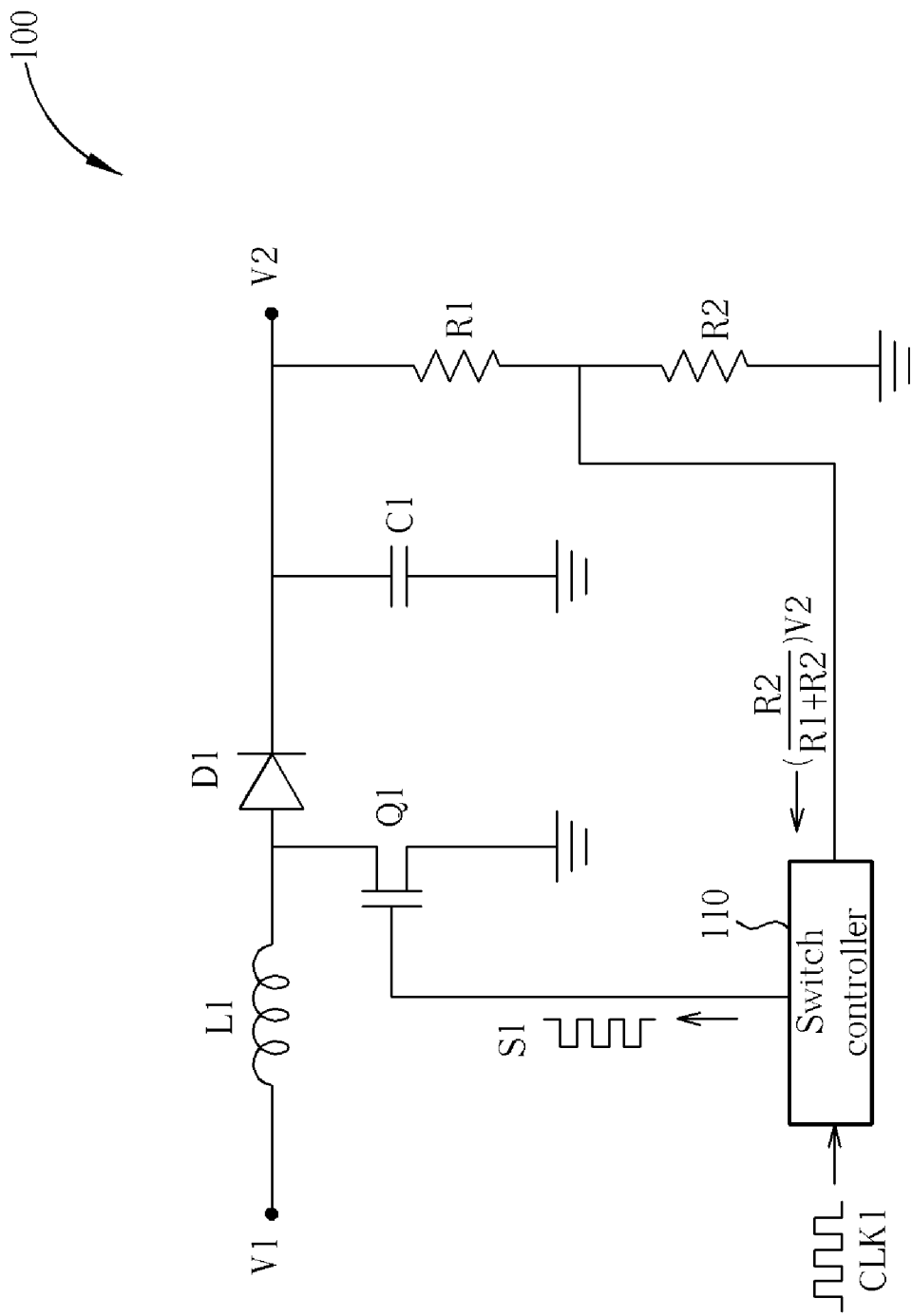
FIG. 1 is a diagram illustrating a conventional DC/DC converter.
Figure 2:
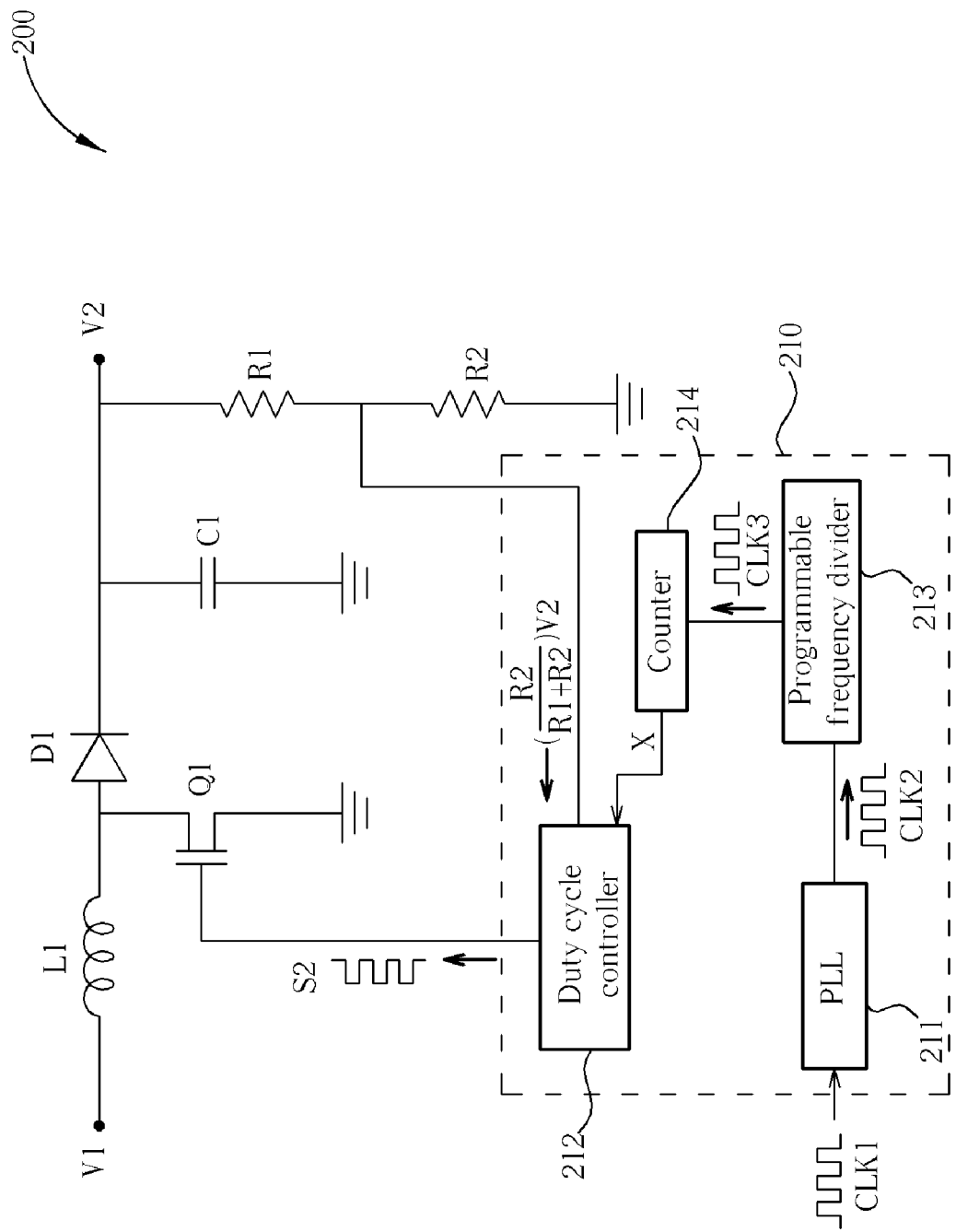
FIG. 2 is a diagram illustrating the DC/DC converter with spread spectrum switching signals of the present invention.

Please refer to FIG. 2. FIG. 2 is a diagram illustrating the DC/DC converter 200 with spread spectrum switching signals of the present invention. As shown in FIG. 2, the DC/DC converter 200 comprises an inductor L1, a switch Q1, a diode D1, a capacitor C1, two resistors R1 and R2, and spread spectrum switch signal controller 210. The DC/DC converter 200 receives a first DC power source (of a voltage V1), converts the first DC power source into a second DC power source (of a voltage V2), and outputs the second DC power source. The inductor L1 is coupled to the input end for receiving the first DC power source. The switch Q1 is coupled between the inductor L1 and the ground end. The diode D1 is coupled between the switch Q1 and the capacitor C1. The capacitor C1 is coupled between the output end and the ground end. The resistor R1 is coupled between the output end and the resistor R2. The resistor R2 is coupled between the resistor R1 and the ground end. The spread spectrum switch signal controller 210 is coupled to the control end of the switch Q1.

The spread spectrum switch signal controller 210 controls turning on and off the switch Q1. When the switch Q1 turns on, the current stores in the inductor L1. When the switch Q1 turns off, the stored current in the inductor L1 passes through the diode and charges the capacitor C1. The output voltage V2 is the voltage over the capacitor C1. The spread spectrum switch signal controller 210 controls the turning-on period in each cycle (duty cycle) so as to adjust the output voltage V2.

The resistors R1 and R2 are utilized as voltage dividers. The voltage $[R2/(R1+R2)] \times V2$ is fed back to the spread spectrum switch signal controller 210 for informing the spread spectrum switch signal controller 210 of the voltage V2.

The spread spectrum switch signal controller 210 receives a reference clock signal CLK1, and outputs a control signal S2 to the switch Q1 according to the voltage $[R2/(R1+R2)] \times V2$. The duty cycle of the control signal S2+ adjusts according to the voltage $[R2/(R1+R2)] \times V2$ for controlling turning-on/off period of the switch Q1. Thus, the voltage V2 is controlled. That is, when the duty cycle of the control signal S2 is larger, the turning-on period is longer, and the current stored in the inductor L1 is bigger, and thus, the voltage V2 rises gradually. On the other hand, when the duty cycle of the control signal S2 is lower, the turning-on period is shorter, and the current stored in the inductor L1 is smaller, and thus, the voltage V2 drops gradually.

The spread spectrum switch signal controller 210 comprises a Phase Lock Loop (PLL), a duty cycle controller 212, a programmable frequency divider 213, and a counter 214.

The PLL 211 receives the reference clock signal CLK1 and accordingly generates a clock signal CLK2 which of the frequency is multiple of the frequency of the clock signal CLK1. For example, the frequency of the clock signal CLK1 is 12 MHz, and the frequency of the clock signal CLK2 is 72 MHz.

The programmable frequency divider 213 receives the clock signal CLK2 and divides the clock signal CLK2 with a variable divisor for generating a clock signal CLK3. For example, the divisor can be changed from 3 to 9, and that is, the frequency range of the clock signal CLK3 is: [(72/3)=24~(72/9)=8] MHz. In the process of generating the control signal S2, the variable divisor keeps changing so that the frequency of the control signal S2 varies but is centered at the working frequency of the DC/DC converter 200. For example, the working frequency is 12 MHz (72 MHz/6), the divisor increases from 3 to 9, then decreases from 9 to 3, and then the divisor is changed the same way periodically. In this way, the center working frequency is not changed but the frequency of the clock signal CLK3 is spread. The way changing the divisor also can be programmable to fit users' need.

The counter 214 counts the number X that the clock signal CLK3 has passed, and then transmits the number X to the duty cycle controller 212. For example, as each of the rising edges of the clock signal CLK3 passes, the number X increases by 1. Furthermore, the counter 214 can be reset after the number X increases up to a predetermined value. For example, when the number X is up to 10, the counter 214 is reset and the number is reset to be 0.

The duty cycle controller 212 outputs the control signal S2 of a high voltage or a low voltage according to a predetermined value and the number X. For example, if the predetermined value is 6, and when the number X is higher than 6, the duty cycle controller 212 outputs the control signal S2 of the low voltage; on the other hand, when the number X is lower than 6, the duty cycle controller 212 outputs the control signal S2 of the high voltage. The size of the predetermined value is decided according to the voltage $[R2/(R1+R2)]V2$. In this way, the duty cycle of the control signal S2 is controlled to turn on/off the switch Q1 and the voltage V2 is stabilized at a desired level.

Since the clock signal CLK3 received by the duty cycle controller 212 has the characteristic of spread spectrum, the control signal S2 output from the duty cycle controller 212 is based on the characteristic of the clock signal CLK3. Therefore, the control signal S2 reduces interfering effect onto the radio signals of the portable electronic devices, which increases the quality of the connection of the portable electronic devices.

Additionally, the switch Q1 of the present invention can be realized with a Metal Oxide Semiconductor (MOS) transistor or a Bipolar Junction Transistor (BJT).

Those skilled in the art will readily observe that numerous modifications and alterations of the device and method may be made while retaining the teachings of the invention.

What is claimed is:

1. A DC/DC converter with spread spectrum switching signals comprising:
    a converting circuit comprising:
        an input end for receiving a first DC power source;
        an output end for outputting a second DC power source;
        a first resistor coupled to the output end of the converting circuit; and a second resistor coupled between the first resistor and a ground end;
    a spread spectrum switching signal controller for generating a spread spectrum switching signal, wherein the spread spectrum switching signal controller controls a duty cycle of the spread spectrum switching signal according to a voltage divided by the first resistor and the second resistor; and
    a switch coupled to the converting circuit and the spread spectrum switching signal controller, the switch is turned on and off according to the spread spectrum switching signal.

2. The converter of claim 1 wherein the spread spectrum switching signal controller comprises:
    a Phase Lock Loop (PLL) for receiving a first clock signal and accordingly generating a second clock signal;
        wherein frequency of the second clock signal is a multiple of frequency of the first clock signal;
    a programmable frequency divider coupled to the PLL for dividing the second clock signal with a variable divisor to generate a third clock signal;
    a counter coupled to the programmable frequency divider for counting a number of periods of the third clock signal; and
    a duty cycle controller, coupled to the counter and between the first resistor and the second resistor for generating the spread spectrum switching signal by comparing a count of the counter with the voltage divided by the first resistor and the second resistor.

3. The converter of claim 2 wherein the count of the counter increases when the third clock signal is at a rising edge.

4. The converter of claim 2 wherein when the count of the counter equals to a predetermined value, the counter is reset.

5. The converter of claim 2 wherein the variable divisor can be periodically changed so a frequency of the spread spectrum switching signal varies but is centered at a working frequency of the DC/DC converter.

6. The converter of claim 2 wherein a rule to change the variable divisor is programmable.

7. The converter of claim 2 wherein the duty cycle controller determines a first predetermined value according to the voltage divided by the first resistor and the second resistor, and outputs a second predetermined value when the count of the counter is higher than the first predetermined value.

8. The converter of claim 7 wherein the duty cycle controller outputs a third predetermined value when the count of the counter is lower than the first predetermined value.

9. The converter of claim 7 wherein the first predetermined value is programmable.

10. The converter of claim 1 wherein the converting circuit comprises:
    a inductor coupled to the input end of the converting circuit;
    a capacitor coupled to the output end of the converting circuit; and
    a diode coupled between the inductor and the capacitor.

11. The converter of claim 10 wherein a first end of the switch is coupled to the capacitor and the diode, and a second end of the switch is coupled to the ground end.

12. The converter of claim 1 wherein the switch is a Metal Oxide Semiconductor (MOS) transistor.

13. The converter of claim 1 wherein the switch is a Bipolar Junction Transistor (BJT).

* * * * *